United States Patent [19]  
Knifton

[11] 3,904,672  
[45] Sept. 9, 1975

[54] CARBOXYLATION PROCESS FOR PREPARING ALPHA UNSATURATED LINEAR FATTY ACID DERIVATIVES

[75] Inventor: John F. Knifton, Poughquag, N.Y.

[73] Assignee: Texaco Inc., New York, N.Y.

[22] Filed: July 12, 1973

[21] Appl. No.: 378,728

[52] U.S. Cl. ... 260/486 AC; 260/410.9 R; 260/413; 260/469; 260/476 R; 260/479 R; 260/533 A
[51] Int. Cl.² .......................................... C07C 69/54
[58] Field of Search ..... 260/533 A, 533 N, 486 AC, 260/410.9, 413

[56] References Cited
UNITED STATES PATENTS
2,582,911 1/1952 Neher .......................... 260/486 AC
3,700,706 10/1972 Butter ......................... 260/486 AC OTHER PUBLICATIONS
Falbe, J., Carbon Monoxide in Organic Synthesis, Springer–Verkg, N.Y. 1970, 87–90, 95–96, 99–103.

*Primary Examiner*—Lorraine A. Weinberger
*Assistant Examiner*—Paul J. Killos
*Attorney, Agent, or Firm*—T. H. Whaley; C. G. Ries; Bernard Marlowe

[57] ABSTRACT

This invention concerns a process for preparing linear alpha-unsaturated fatty acid derivatives from the reaction of 1-alkynes and carbon monoxide in the presence of a hydroxylated coreactant and a homogeneous ligand-stabilized nobel metal - Group IVB metal halide catalyst complex.

14 Claims, No Drawings

CARBOXYLATION PROCESS FOR PREPARING ALPHA UNSATURATED LINEAR FATTY ACID DERIVATIVES

SUMMARY OF THE INVENTION

This invention relates to the catalytic conversion of 1-alkynes to alpha-unsaturated linear fatty acid derivatives.

More particularly, this invention concerns the carboxylation of 1-alkynes in the presence of hydroxylated coreactant, with carbon monoxide under mild reaction conditions of temperature and pressure, using ligand-stabilized palladium or platinum - Group IVB metal halide catalyst complexes to produce linear, alpha-unsaturated fatty acids and the esters of said fatty acids.

Carboxylation as used throughout this disclosure and claims refers to the process of preparing as the predominant product linear alpha-unsaturated linear fatty (carboxylic)acids or esters from 1-alkyne substrates. These linear alpha-unsaturated fatty esters are of the type: $RCH=CHCOOR'$, wherein R is a saturated alkyl radical containing zero to 20 carbon atoms, wherein R' is an alkyl radical containing one to 12 carbon atoms, or hydrogen.

BACKGROUND OF THE INVENTION

Unsaturated carboxylic acids and their esters as defined above are utilized for a variety of multi-tonnage end uses and applications. An important group of unsaturated esters are the acrylates and to a lesser extent acrylic acid. In fact, the estimated market for the acrylates and the free acids in the United States exceeds 300,000,000 pounds a year. Typical applications include coatings, paints, textiles, fibers and polymers.

The higher molecular weight unsaturated fatty acids, containing considerably more carbon atoms in the linear chain, particularly those from $C_{12}$ to $C_{18}$ range, are usually produced by hydrolysis of naturally occurring fats end oils. Again huge quantities are produced, current estimates range in the 500 million-600 million pound a year range. Applications for these higher molecular weight products are also diverse, including surfactants, coatings, paints, polymers and as chemical intermediates among others.

There is no paucity of preparative synthetic methods for producing the acrylates and their higher homologues. Processes include acetylene carboxylation, propylene oxidation, and ethylene oxidation, among others. See "Carbon Monoxide in Organic Synthesis"* for a rather thorough review of related art concerning those processes involving carbon monoxide.

*J. Falbe, Chapter II (1970 Ed.) Published by Springer-Verlag, New York

KNOWN PRIOR ART

The closest prior art processes for preparing similar fatty acids or esters employ Reppe Nickel (or other nickel catalysts) with carbon monoxide, generally under more severe reaction conditions with some basic disadvantages. For example, whereas applicant's process produces almost exclusively unbranched (linear) alpha-unsaturated fatty acids or esters through atypical addition across the double bond (contrary to Markownikoff's rule), Jones et al. [J. Chem. Soc., 230 (1950)] produce almost exclusively branched, alpha-unsaturated fatty acids, where the 1-alkyne contains three or more carbon atoms. Similarly, insofar as is known even in instances where carbon monoxide has been reported to undergo non-Markownikoff addition, the products were obtained in minor quantities. In two commercially employed carboxylations to make acrylate esters, toxic catalysts such as nickel carbonyls or other nickel salts are utilized.

In any event, the known reported synthetic work all suffers from one or more basic shortcomings such as toxic catalysts, stringent reaction conditions and/or poor selectivity and yields of the desired linear unsaturated fatty acid. For these reasons, a synthetic process which obviates the disadvantages of the known prior art would represent a substantial improvement over the current preparative procedure.

Ideally, a desirable process would employ the widely available 1-alkynes, carbon monoxide and hydroxylated reactants such as alkanols and/or water (depending upon whether the free acid or ester is sought) under mild conditions of temperature and pressures at relatively high alkyne to catalyst ratios, to produce linear, alpha-unsaturated fatty acids or esters, in good yield, comparatively free from tenacious contaminants.

It has now been determined that certain ligandstabilized homogeneous noble-metal catalysts, typified by palladium and platinum in the two (II) valence state or platinum in the four (IV) valence state, in combination with a Group IVB metal halide such as tin (II) chloride, offer desirable advantages presently sought in the art without the concurrent disadvantages elaborated above. That is, acetylene and its higher homologues can be carboxylated to the desired linear, alpha-unsaturated fatty acids or esters in good yield free from substantial quantities of branched chain and other undesirable by-products. Surprisingly enough, particularly when acetylene is used as the alkyne substrate, good conversions and selectivities can be obtained when the reaction is carried out at about room temperatures and atmospheric or near atmospheric pressures. This is unexpected in view of the more rigorous reaction conditions that may be required when acetylene is carboxylated using nickel carbonyl or other nickel salt catalysts favored in the prior art.

In the broad practice of this invention 1-alkynes are converted to predominantly linear, alpha-unsaturated fatty acids or their esters by the process of:

a. admixing each mole of alkyne to be carboxylated with at least a molar equivalent of hydroxylated reactant, a catalytic quantity of a homogeneous, ligand-stabilized noble metal complex in combination with excess Group IVB metal halide, in an oxygen-free environment, in the presence of an ambient or pressurized carbon monoxide atmosphere, to form a reaction mixture, and b. heating said reaction mixture at 20°C, and above, until substantial carboxylation of the 1-alkyne to the desired linear alpha-unsaturated fatty acid or ester is formed, and isolating the fatty acid or ester contained therein.

In order to present the inventive concept in the greatest detail, the following supplementary disclosure will be submitted:

A. Process Sequence and Variations. In general, the components of the carboxylation reaction mixture including optional inert solvent, hydroxylated co-reactant, 1-alkyne and catalyst may be added in any sequence as long as good agitation is employed to provide a homogeneous mixture. For example, the following represent some variations insofar as the catalyst, sequence of CO addition and heating step that may be made without departing from the inventive process. These modifications include:

1. The catalyst may be preformed and added as a complete catalytic entity to the reaction mixture containing 1-alkyne and/or hydroxylated coreactant.
2. Preferably to minimize stability problems with the catalyst, the catalyst is best formed in situ usually in the presence of an inert gas "blanket" or "purge" with the Group IVB metal halide being in excess followed by the separate, or concurrent, addition of the ligandstabilized noble metal catalyst complex.
3. After using either variation one or two the reaction mixture containing catalyst is contacted with CO and heated at atmospheric or higher pressures with hydroxylated coreactant until product is formed. If water is the hydroxylated coreactant in the reaction mixture, then the principal product will be a linear unsaturated fatty acid having one more carbon atom than the 1-alkyne charged. If an alkanol is employed as coreactant, the corresponding ester of the unsaturated carboxylic acid will be formed. The formation of the ester is useful both in product applications, and for rapid chromatographic analysis to follow the course of the reaction.
4. After using either variation one or two the catalyst solution, 1-alkyne and hydroxylated coreactant can be heated first under an inert atmosphere, such as is provided with nitrogen, and agitated at ambient or near ambient temperatures and pressures. If the activity of the catalyst requires it, higher temperatures and pressures can be used to carboxylate with the carbon monoxide and hydroxylated coreactant.
5. A substantial process variation that can be employed when the catalyst is formed in situ in an inert solvent is to heat the catalyst containing solution to reaction temperature under an inert atmosphere, or a small pressure of CO, and then to add the hydroxylated CO-reactant, the 1-alkyne and carbon monoxide with efficient agitation, and to maintain the desired CO pressure in the reactor until the ester or free acid is formed.

B. Ligand-Stabilized Noble Metal — Group IVB metal Halide Catalysts*. The ligand-stabilized noble metal-Group IVB halide catalysts of this invention contain one or more stabilizing ligands having one or more Group VB or VIB donor atoms selected from the group consisting of phosphorous, arsenic, and sulphur. These donor atoms may be bonded to one or more hydrocarbyl radicals, including unsubstituted alkyl radicals containing one to six carbon atoms, phenyl, alkylated phenyl in which the one or more alkyl substituents contain a total of four carbon atoms, alkoxy substituted phenyl in which the alkyl portion of the alkoxy group contains one to four carbons, and other substituted phenyls including halogen substituted phenyl radicals.

*Insofar as is known these catalysts are known materials or analogous to known material whose preparation is described in the literature. See for example, P. V. Parish et al., J. Chem. Soc.(Dalton), 37(1973) and references.

Illustrative of the Group VB and VIB donor ligands that may be used to stabilize the palladium (II) catalysts are: $As(C_6H_5)_3$, $P(C_6H_5)_3$, $P(CH_3)_2(C_6H_5)$, $As(n-C_4H_9)_3$, $P(p-Cl-C_6H_4)_3$, $P(p-CH_3-C_6H_4)_3$, $P(p-Cl-C_6H_4)_3$, $P(p-CH_3·C_6H_4)_3$, $P(p-CH_3O·C_6H_4)_3$, $P(C_6H_{11})_3$, $(C_6H_5)_2P(CH_2)_2P(C_6H_5)_2$, $P(OC_6H_5)_3$, $S(C_6H_5)_2$ and $P[(p-CH_3C_6H_4)(C_6H_5)_2]$.

Illustrative of the Group IVB metal halides that can be complexed with the ligand-stabilized palladium (II) to form an active carboxylation catalyst are tin (II) chloride, tin(VI) chloride, tin(II) bromide, germanium-(II) chloride, germanium(II) bromide, and tin(II) chloride dihydrate.

The following complexes are among the many ligand-stabilized noble metal-Group IVB metal halide complexes which can be used in the inventive carboxylation as the catalyst system:

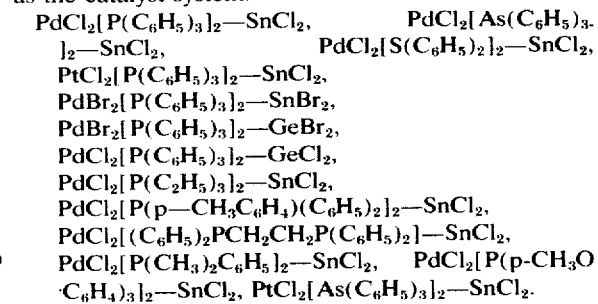

One convenient mode of preparation of the ligand-stabilized noble metal-Group IVB metal halide catalyst complexes is in situ wherein the noble metal halide complex, such as $PdCl_2[P(C_6H_5)_3]_2$, is mixed with a large molar excess of Group IVB metal halide preferentially $SnCl_2$ or $GeCl_2$.

As the above disclosure of homogeneous ligand-stabilized noble metal catalyst complexes discloses, numerous catalysts can be employed to produce the alphaunsaturated linear fatty acid derivatives by the inventive process. However, as is frequently the case when a broad group or class of materials is concerned, a smaller group within the parameters of the broad group is favored as compared to the group as a whole for one or more reasons. In this instance the favored groups are those which contain palladium and platinum as the catalytic metal in the form of a ligand-stabilized noble metal complex of the structure:

wherein X is a halogen selected from the group consisting of chlorine and bromine, M is the noble metal selected from palladium and platinum, E is a donor atom selected from phosphorus and arsenic, and R is a hydrocarbyl radical selected from unsubstituted alkyl radicals containing one to six carbon atoms, phenyl, alkoxy substituted phenyl radicals in which the alkyl portion of the alkoxy group contains from one to four carbon atoms, alkylated phenyl in which the alkyl groups contain a total of one to four carbon atoms, and mixtures thereof.

The favored ligand-stabilized noble metal-Group IVB halide catalysts of this invention are selected from the favored ligand-stabilized noble metal complexes described supra when in combination with a Group IVB metal halide selected from the group consisting of tin-(II) chloride, tin(II) bromide, tin(II) chloride dihydrate, germanium(II) chloride and germanium(II) bromide.

Examples of the favored catalysts include bis(triphenylphosphine)palladium(II) chloride-tin(II) chloride, bis(tri-p-tolyphosphine)palladium(II) chloride - tin(II) chloride, bis(tri-p-methoxyphenylphosphine) palladium(II) chloride - tin(II) chloride, and bis(dimethylphenylphosphine)palladium(II) - tin(II) chloride.

C. pKa — While it is presently unclear why the basicity of the stabilizing ligand is significant, evidently this basicity may be an important factor in determining catalyst efficiency, particularly where the carboxylation is of a monosubstituted (1-) alkyne and the ligand-stabilized noble metal-Group IVB metal halide catalyst is a palladium complex. More specifically, it has been found that phosphine-stabilized palladium(II)-tin(II) chloride catalysts where the phosphorus donor ligands have a pKa value of between 0 and about 6 produce the highest selectivity and yield of linear, alpha-unsaturated fatty acid ester, wherein 1-heptyne is the 1-alkyne employed. The data in Table III are evidenciary of this preferred narrower range of phosphine ligand, where the pKa values are taken from a publication by C. A. Strevli [Anal. Chem., 32, 985(1960)].

D. Ratio of Ligand Stabilized Palladium(II) Halide Catalyst Complex to 1-heptyne substrate — Experimental work indicates that a molar ratio of up to 500 moles of 1000 moles of 1-alkyne per mole of palladium(II) catalyst complex can be employed in most instances where 1-alkynes typified by 1-heptyne are used as the substrate. Much lower ratios (i.e., 25 moles of 1-alkyne substrate per mole of palladium halide) are not harmful but are economically unattractive. For this reason the preferred molar range arrived at in Table II ranges from 50 to 200 moles of 1-alkyne per mole of palladium(II) complex catalyst.

E. Temperature Required for Carboxylation — The temperature range which can be employed for carboxylation is variable dependent upon several experimental factors including the 1-alkyne employed, the pressure, the concentration and the particular choice of palladium catalyst among other things. Again using 1-heptyne as a typical 1-alkyne and $PdCl_2[P(pCH_3 \cdot C_6H_4)_3]_2$—$SnCl_2$ as a representative catalyst, the range of operability is from about 20° to 120°C as evidenced from the data in Table I.

F. Pressure — The substantial conversion of 1-alkynes to their unsaturated carboxylic acid (or ester) derivatives using $PdCl_2[P(p-CH_3 \cdot C_6H_4)_3]_2$—$SnCl_2$ as catalyst, and 1-heptyne as the 1-alkyne substrate, may be carried out under reaction pressures of from one to at least 200 atmospheres. Table I provides the supporting experimental data which establishes that operating pressures up to at least 200 ATM lead to the formation of substantial quantities of the desired linear alpha-unsaturated acid derivative.

G. Reaction Times Required — As previously indicated in the analogous discussion on temperatures and pressures required in the reaction, experimental variables are important in arriving at reaction times. Generally substantial conversions of the 1-alkyne to the unsaturated esters or unsaturated carboxylic acids can almost always be accomplished within 6 hours with 2 to 4 hours representing the more usual reaction time interval.

H. 1-Alkynes as Substrates — 1-alkynes ranging in carbon content from two up to 22 carbon atoms can be employed. Illustrative linear monosubstituted alkyne substrates include ethyne (acetylene), 1-propyne, 1-butyne, 1-heptyne, 1-octyne, 1-nonyne, 1-decyne, as well as their higher homologues. However, corresponding alkyne substituted aromatics such as phenylacetylene and diphenylacetylene can also be carboxylated. The 1-alkyne substrates may be utilized neat or in conjunction with one or more inert background solvents such as the saturated paraffins including pentanes, hexanes, heptanes, octanes, aromatics such as benzene, toluene, xylene, ketones such as MIBK and the like.

The 1-alkynes can be in form of single, discrete compounds or in the form of mixtures. Because of their relatively low cost and availability individual (specific) alkynes containing from two to 10 carbon atoms are favored with acetylene being the preferred substrate for carboxylation when the preferred ligand-stabilized palladium(II)-tin(II) chloride complexed homogeneous catalysts are employed at the temperatures and pressures referred to supra.

I. Hydroxylated (Alcohol) Coreactant — If it is desired to prepare linear unsaturated fatty acid esters, an alcohol coreactant must be present in the reaction mixture with the 1-alkyne substrate and carbon monoxide. The alcohol while usually a monohydric primary or secondary alkanol of up to 12 carbon atoms can also be a substituted alcohol, a phenol, or a substituted phenol. Suitable examples include methanol, ethanol, isopropanol, docecanol, phenol, 2-chloroethanol, methylcyclohexanol, 2-ethylhexanol and the like.

Alternatively, the alcohol may be a polyol containing two or more hydroxyl groupings. Illustrative examples of suitable polyols include propylene glycol, neopentyl glycol, trimethylol propane and pentaerythritol. As indicated earlier the use of water produces the free acid.

J. Carbon Monoxide Environment — Insofar as can be determined, the best selectivities and conversions of 1-alkynes to linear alpha-unsaturated fatty acids and esters can be obtained within a reasonable reaction time by using a substantially carbon monoxide (at least 85–95%) gaseous atmosphere. However, particularly in continuous operation the carbon monoxide may be used in conjunction with form about 0 to 30% by volume of one or more inert gases such as nitrogen, argon, neon and the like without experiencing a substantial decrease in yield and selectivity.

K. Inert Solvents — The novel carboxylation is run most conveniently in the presence of inert diluent. A variety of solvents can be used, including aromatics such as benzene, toluene and xylenes, halogenated aromatics including o-dichlorobenzene, ketones like acetone and methyl isobutyl ketone, ethers such as dimethoxyethane and p-dioxane, and halogenated paraffins including methylene chloride or any other disclosed supra.

L. Selectivity as defined herein is the efficiency in catalyzing a desired carboxylation reaction relative to other undesired carboxylation reactions; in this instance carboxylation to the linear fatty acid or ester derivative is the desired conversion. Selectivity is usually expressed as a percentile and is calculated herein by determining the amount of linear unsaturated carboxylated product formed, divided by the total amount of carboxylated products formed and multiplying the quotient obtained by 100.

M. Conversion as defined herein is the efficiency in converting the 1-alkynes to unsaturated fatty acid or ester products. Conversion also is expressed as a percentile and is calculated herein by dividing the amount of 1-alkyne consumed during carboxylation by the amount of 1-alkyne originally charged and multiplying the quotient by 100.

N. Yield as defined herein is the efficiency in catalyzing a desired carboxylation reaction relating to other undesired reactions. In this instance, carboxylation to the linear alpha-unsaturated fatty acid or ester derivative is the desired conversion. Yield is usually expressed as a percentile, and is calculated herein by determining the amount of linear unsaturated carboxylated product formed, divided by the theoretical amount of product which could form, and multiplying the quotient by 100.

O. By-Products — As far as can be determined, without limiting the invention thereby, carboxylation of 1-alkynes catalyzed by the ligand-stabilized palladium-(II)-Group IVB metal halide complexes leads to the formation of only minor amounts of by-products. These include: (a) branched acids or branched esters due to CO addition at the beta (second) carbon atoms of the 1-alkyne charge, and (b) polymers due to alkyne polymerization. For runs made under various experimental conditions, the extent of branched ester product formation is listed in the following tables under percent linear ester (calculated from: total linear acid ester/total linear + branched ester). These branched ester products may be separated from the desired linear fatty acids or esters by the usual chemical or physical techniques taught in the technical literature.

P. Identification procedures where applicable are by one or more of the following analytical procedures — gas chromatography (g.c.), infrared, nuclear magnetic resonance and elemental analysis. Unless otherwise specified all percentages are by weight rather than volume and all temperatures are in centigrade rather than fahrenheit.

Having described the inventive process in general terms, the following examples are submitted to supply specific and illustrative embodiments.

EXAMPLE 1

Preparation of Methyl Acrylate Using Bis(tri-p-tolylphosphine)Palladium(II)-Tin(II) Chloride Catalyst.

1A. To a reactor providing agitating, heating, cooling and pressurizing means is added a charge of 80 ml of methyl isobutyl ketone, containing 0.5 mmole of $PdCl_2[P(pCH_3\cdot C_6H_4)_3]_2$ complex and 5.0 mmole of $SnCl_2\cdot 2H_2O$ and a stoichiometric excess (6 ml) of methanol. Through the degassed, vigorously stirred charge is bubbled an approximately equivolume mixture of carbon monoxide and acetylene gases at 21°–22°C. After 6 hours, gas chromatographic analysis (G.C.A.) of the red solution confirms the presence of methyl acrylate (0.01M) as the only detectable carboxylate product. The presence of acetone (an impurity in the acetylene feed) in trace amounts is also confirmed.

1B. To a reactor equipped as in (1A) and charged as in (1A) except that 80 ml of benzene is substituted for the 80 ml of methyl isobutyl ketone, the identical reaction is run with the same quantities of ingredients as above. Again G.C. analysis confirms the methyl acrylate formation.

1C. Using the reactor and procedure of (1A) in all respects except for the substitution of anhydrous $SnBr_2$ for $SnCl_2$ on a molar basis, the preparation of methyl acrylate product is confirmed as in (1A).

1D. Using the reaction conditions, procedure and reactor of (1A) the preparation of methyl acrylate is duplicated substituting 0.5 mmole of $PdCl_2[P(p-C_2H_5\cdot C_6H_4)_2]_2$ for the same amount of $PdCl_2[P(p-CH_3\cdot C_6H_4)_3]$ used in (1A).

EXAMPLE 2

Preparation of Ethyl Acrylate

Once again the apparatus, procedure and charge used to prepare methyl acrylate in (1A) is virtually duplicated, except that a 8 ml portion of anhydrous ethanol replaces methanol as the hydroxylated coreactant. G.C. analysis confirms the presence of the expected ethyl acrylate.

EXAMPLES 3 AND 4

Preparation of Propyl Acrylate and Butyl Acrylate

In two runs closely related to Run (1A) 10 ml portions of n-propanol and n-butanol are substituted separately for the 6 ml of methanol. Again as in (1A) after 6 hours the reaction is terminated, and G.C. analysis reveals the preparation of propyl acrylate and butyl acrylate respectively.

EXAMPLE 5

Preparation of Methyl 2-Octenoate from 1-Heptyne using Bis(Tri-p-Methoxyphenyl Phosphine)Palladium(II)-Tin(II) chloride The procedure and reactants used for this preparation are those used in Example (1A) except that 6 ml of methanol is employed, the temperatures and pressures are 24°C and 1 atmosphere, respectively, and that catalyst $PdCl_2[P(p-CH_3O\cdot C_6H_4)_3]_2$, (0.5 mmole) with a 1-heptyne/Pd mole ratio of 50:1, and a Pd:Sn mole ratio of 10 is used. The reaction is terminated at the end of 4 hours. G.C. analysis indicates a 96.7% selectivity to methyl 2-octenoate and a yield of 34%.

EXAMPLE 6

Preparation of Ethyl 2-Octenoate from 1-Heptyne using the Catalyst of Example 5

The same procedure, catalyst and reaction parameters of the preceding example are employed, the only variable being the substitution of 10 mls of ethanol for the methanol utilized in Example 5. G.C. analysis establishes the presence of the ethyl 2-octenoate product.

EXAMPLE 7

Preparation of Butyl 2-Octenoate from 1-Heptyne using the Catalyst of Example 5

The same procedure, catalyst and reaction parameters of Example 5 are employed, the only variable being the substitution of 10 mls of n-butanol for the methanol used in Example 5. G.C. analysis establishes the formation of butyl 2-octenoate.

EXAMPLES 8 TO 10

Carboxylation of other Acetylene Homologues Using the Palladium Catalyst of Example 1A Using the general procedure and reaction conditions disclosed in Part (1A) of Example 1, carboxylations are carried out on the following alkyne substrates.

| Example | Alkyne Substrate |
|---|---|
| 8 | Diphenylacetylene |
| 9 | Phenylacetylene |
| 10 | Methylacetylene |

EXAMPLES 11 TO 18

Preparation of Methyl 2-Octenoate from 1-Heptyne using the PdCl$_2$[P(p-CH$_3$C$_6$H$_4$)$_3$]$_2$ Catalyst - Effect of Temperature and Pressure In this group of examples, reaction temperatures, reaction pressures and reaction times are varied to obtain optimum selectivities and yields. Table I summarizes the data. As can be seen, milder pressures and temperatures favor high selectivity to the linear alpha-unsaturated fatty acid ester, methyl 2-octenoate, while the rate of carboxylation is faster at higher reaction temperatures.

EXAMPLES 19 TO 22

Preparation of Methyl 2-Octenoate from 1-Heptyne using the PdCl$_2$[P(p-CH$_3$C$_6$H$_4$)$_3$]$_2$—SnCl$_2$ Catalyst - Effect of alkyne and catalyst Concentrations Table II shows the data obtained when the concentrations of 1-heptyne and designated palladium catalyst in the reaction mixture are varied using the procedure of Example 5. It is evident from the data that the formation of the desired methyl 2-octenoate is favored by the use of alkyne-to-palladium catalyst mole ratios in the range 50 to 200.

ladium(II) and platinum-Group IVB metal halide homogeneous catalysts under constant temperature, pressure, substrate-to-catalyst molar ratios. Methyl isobutyl ketone was used as solvent in all runs. As can be seen from the data in Table III, which follows, a variety of stabilizing ligands can be used with the palladium(II) and platinum-Group IVB metal halide catalysts, including Group VB donor ligands containing phosphorus and arsenic as the donor atoms. These ligands may be monodentate or multidentate, and may contain the alkyl, aryl and substituted aryl groupings.

The Group IVB metal halide co-catalyst may be selected from the group including tin(II) chloride, germanium(II) chloride and hydrated tin(II) chloride. Poor methyl 2-octenoate yields and selectivies are obtained with ligand-stabilized palladium(II) complexes, such as bis(triphenylphosphine)palladium(II) chloride, in the absence of the Group IVB metal halide co-catalyst (See Example 24) and with platinum-Group IVB metal halides in the absence of additional Group VB or VIB donor ligands (See Example 26). Improved methyl 2-octenoate yields and selectivities are obtained particularly with bis(triphenylphosphine)palladium(II) chloride - tin(II) chloride dihydrate, bis(tri-p-tolylphosphine)palladium(II) chloride - tin(II) chloride dihydrate, and bis(dimethylphenylphosphine) palladium-

TABLE I

Preparation of Methyl 2-Octenoate from 1-Heptyne using the [(p-CH$_3$C$_6$H$_4$)$_3$P]$_2$PdCl$_2$-SnCl$_2$ Catalyst*

| | | CARBOXYLATION | | | METHYL 2-OCTENOATE | | |
|---|---|---|---|---|---|---|---|
| EXAMPLE | PRESSURE (ATM.) | TEMPERATURE (°C) | TIME (MIN) | 1-HEPTYNE CONVERSION (%) | SELECTIVITY (MOLE %) | YIELD (MOLE %) | RATE (M/HR) |
| 11 | 200 | 120 | 360 | N.D.** | 56 | 35 | N.D. |
| 12 | 200 | 70 | 360 | 70 | 60 | 43 | N.D. |
| 13 | 140 | 21 | 90 | 95 | 61 | 60 | >0.30 |
| 14 | 70 | 70 | 60 | 89 | 78 | 36 | 0.32 |
| 15 | 70 | 21 | 180 | 82 | 68 | 37 | 0.25 |
| 16 | 7 | 21 | 300 | N.D. | 75 | 15 | N.D. |
| 17 | 1 | 22 | 240 | 64 | 93 | 54 | N.D. |
| 18 | 1 | 22 | 360 | 62 | 93 | 55 | 0.083 |

*Carboxylation Conditions: Solvent, Methyl Isobutyl Ketone, [1-Heptyne]/[Pd] = 100, [Methanol]/[1-Heptyne] = 7.5
**N.D. = Not Determined

TABLE II

Preparation of Methyl 2-Octenoate from 1-Heptyne using the [(p-CH$_3$C$_6$H$_4$)$_3$P]$_2$PdCl$_2$-SnCl$_2$ Catalyst*

| | | | | | METHYL 2-OCTENOATE | |
|---|---|---|---|---|---|---|
| EXAMPLE | 1-HEPTYNE (M) | Pd CATALYST (M) | [1-HEPTYNE]/[Pd] RATIO | 1-HEPTYNE CONVERSION (%) | SELECTIVITY (MOLE %) | YIELD (MOLE %) |
| 19 | 0.27 | 5.3 × 10$^{-3}$ | 50 | 95 | 61 | 60 |
| 20 | 0.52 | 5.2 × 10$^{-3}$ | 100 | 70 | 60 | 43 |
| 21 | 0.52 | 2.6 × 10$^{-3}$ | 200 | 35 | 59 | 18 |
| 22 | 0.50 | 1.0 × 10$^{-3}$ | 500 | 15 | 55 | 0.8 |

*Carboxylation Conditions: Solvent, Methyl Isobutyl Ketone, [Methanol]/[1-Heptyne] = 7.5, Temperature, 80°C; Pressure, 200 ATM, Time, 360 min.

EXAMPLES 23 TO 34

Preparation of Methyl 2-Octenoate from 1-Heptyne using different Ligand-Stabilized Palladium(II) and Platinum-Group IVB Metal Halide Catalyst Complexes In these examples the carboxylations were carried out on 1-heptyne using various ligand-stabilized palladium(II) chloride - tin(II) chloride catalysts (Examples 23, 27 and 31, respectively).

TABLE III

Preparation of Methyl 2-Octenoate from 1-Heptyne Using Different Ligand-Stabilized Palladium(II) and Platinum-Group IVB Metal Halide Catalyst Complexes*

| EXAMPLE | CATALYST | PHOSPHINE pKa** | 1-HEPTYNE CONVERSION (MOLE %) | YIELD (MOLE %) | SELECTIVITY (MOLE %) | METHYL 1-HEPTENE 2-CARBOXYLATE YIELD (MOLE %) |
|---|---|---|---|---|---|---|
| 23 | $PdCl_2[P(C_6H_5)_3]_2$-$SnCl_2$ | 2.73 | 99 | 48 | 51 | 47 |
| 24 | $PdCl_2[P(C_6H_5)_3]_2$ | 2.73 | 99 | 16 | 19 | 68 |
| 25 | $PtCl_2[As(C_6H_5)_3]_2$-$SnCl_2 \cdot 2H_2O$ | | 94 | 21 | 30 | 49 |
| 26 | $[PtCl_6]^{2-}$-$SnCl_2 \cdot 2H_2O$ | | 99 | 13 | 18 | 60 |
| 27 | $PdCl_2[P(p-CH_3 \cdot C_6H_4)_3]_2$-$SnCl_2$ | 3.5 | 70 | 43 | 60 | 29 |
| 28 | $PdCl_2[P(p-CH_3O \cdot C_6H_4)_3]_2$-$SnCl_2$ | 4.46 | 49 | 32 | 61 | 21 |
| 29 | $PdCl_2[P(o-CH_3O \cdot C_6H_4)_3]_2$-$SnCl_2 \cdot 2H_2O$ | | 4.2 | 0.8 | 54 | 0.8 |
| 30 | $PdCl_2[P(p-Cl \cdot C_6H_4)_3]_2$-$SnCl_2$ | 2.0 | 15 | 6.7 | 35 | 13 |
| 31 | $PdCl_2[P(CH_3)_2C_6H_5]$-$SnCl_2$ | 5.7 | 71 | 51 | 81 | 12 |
| 32 | $PdCl_2[P(C_6H_5)_3]_2$-$GeCl_2$ | 2.73 | 20 | 3.4 | 31 | 7.5 |
| 33 | $PdCl_2[P(C_6H_{11})_3]_2$-$SnCl_2 \cdot 2H_2O$ | 9.7 | 3.0 | Trace | N.D.*** | |
| 34 | $PdCl_2[S(C_6H_5)_2]_2$-$SnCl_2$ | | 24 | Trace | N.D. | |

*Reaction Conditions: Solvent, MIBK; Temp.80°C; Pressure, 200 ATM; Time, 360 Min., [1-Heptyne]/[Pd]=100; [Methanol]/[1-Heptyne]=7.6; [Sn]/[Pd]=10
**pKa of BH⁺
***ND = Not Determined As the numerous examples and preceding discussion have documented, several advantages accrue from the practice of this invention both in its compositional aspect and its process aspect.

For example, a relatively large group of ligand-stabilized noble metal - Group IVB metal halide catalysts are provided which were hitherto not known to be useful as catalysts for the carboxylation of 1-alkynes to either their linear alpha-unsaturated fatty acid esters or to the linear alpha-unsaturated free acids. These homogeneous compositions offer the further advantage of being readily available by well known preparative procedures and they have carboxylation efficacies even at substrate to catalyst molar ratios as high as 500 to 1,000 to 1, dependent upon the 1-alkyne substrate and the particular catalyst employed. Quite unexpectedly, generally the activity pattern of these palladium complexes does not necessarily follow that of the corresponding platinum complex. This can be seen by the data presented in Table III of this application.

In its process aspect this invention provides a novel process for carboxylating relatively low value 1-alkyne substrates to more costly linear alpha-unsaturated fatty acids or esters. In addition, reaction times are rapid, the process lends itself to either batch or continuous operation, employing standard equipment. Further, the conversions of 1-alkynes are ordinarily above 70% and selectivities to the linear alpha-unsaturated acid or ester may be of the order of 85% and higher.

An unusual and unexpected facet of the process is that in all the additions of the carboxylation reagents to 1-alkynes above acetylene the addition takes place largely contrary to Markownikoff's rule, that is the negative portion of the reagents goes to the carbon of the carbon-carbon multiple bond which is bonded to hydrogen rather than to the carbon bearing alkyl groupings.

A further advantage of the instant invention is that while in some respects reaction conditions are critical to success, in other respects the process offers flexibility. That is, numerous modifications and changes can be made in catalyst and conditions without departing from the inventive concept. The metes and bounds can best be determined by reading the claims which follow, in light of the preceding specification.

What is claimed is:

1. A process of carboxylating 1-alkynes containing two to 22 carbon atoms to their linear, alpha-unsaturated fatty acid derivatives consisting essentially of:
   a. admixing each molar equivalent of 1-alkyne to be carboxylated with at least a molar equivalent of hydroxylated coreactant, at least a catalytic quantity of ligand-stabilized noble metal - Group IVB metal halide catalyst complex, selected from the group consisting of $PdCl_2[P(C_6H_5)_3]_2$—$SnCl_2$, $PtCl_2[As(C_6H_5)_3]_2$—$SnCl_2 \cdot 2H_2O$, $PdCl_2[P(p-CH_3$—$C_6H_4)_3]_2$—$SnCl_2$, $PdCl_2[P(p-CH_3OC_6H_4)_3]_2$—$SnCl_2$, $PdCl_2[P(CH_3)_2C_6H_5]$—$SnCl_2$ and $PdCl_2[P(C_6H_5)_3]_2$—$GeCl_2$ in the presence of an oxygen-free environment, to form a reaction mixture, and
   b. heating said reaction mixture between about 20°C and 120°C, in the presence of at least a stoichiometric quantity of carbon monoxide at pressures ranging from about one to 200 atmospheres, until said linear alpha-unsaturated fatty acid derivatives are formed.

2. The process of claim 1 wherein the hydroxylated reactant is an alkanol.

3. The process of claim 2 wherein the 1-alkyne is a linear monosubstituted alkyne.

4. The process of claim 2 wherein the 1-alkyne is acetylene.

5. The process of claim 2 wherein said catalyst complex is preformed.

6. The process of claim 2 wherein said catalyst is prepared in situ.

7. A process of carboxylating 1-alkynes containing two to 22 carbon atoms to their linear, alpha-unsaturated fatty acid derivatives, consisting essentially of: admixing each molar equivalent of 1-alkyne to be carboxylated with:
   1. from 1 to 7.5 molar equivalents of alkanol containing from one to 12 carbon atoms,
   2. from 0.002 to 0.05 molar equivalents of a ligand-stabilized palladium metal complex selected from the group consisting of $PdCl_2[P(p-CH_3OC_6H_4)_3]_2$—$SnCl_2$, $PdCl_2[P(p-CH_3$—$C_6H_4)_3]_2$—$SnCl_2$, $PdCl_2[P(C_6H_5)_3]$—$GeCl_2$,
   3. from 0.01 to 0.20 molar equivalents of Group IVB metal halides selected from the group consisting of tin(II) chloride, and germanium(II) chloride, in the presence of an oxygen-free environment to form a reaction mixture, 4. introducing at least one mole of carbon monoxide in the presence of an oxygen-free environment to form a reaction mixture, and heating said mixture between about 20°C to 120°C, at pressures ranging from about 1 to 200 atmospheres, until the linear, alpha-unsaturated fatty acid derivatives are formed.

8. The process of claim 1 wherein the hydroxylated reactant is water.

9. The process of claim 1 wherein the palladium catalyst employed is $PdCl_2[P(p-CH_3 \cdot C_6H_4)_3]_2$—$SnCl_2 2H_2O$.

10. The process of claim 1 wherein the palladium catalyst employed is $PdCl_2[P(p-CH_3OC_6H_4)_3]_2$—$SnCl_2 2H_2O$.

11. The process of claim 1 wherein the palladium catalyst employed is $PdCl_2[P(CH_3)_2C_6H_5]_2$—$SnCl_2$.

12. The process of claim 1 wherein the palladium catalyst employed is $PdCl_2[P(C_6H_5)_3]_2$—$SnCl_2 2H_2O$.

13. The process of claim 7 in which the 1-alkyne is acetylene, and the linear, alpha-unsaturated fatty acid derivative is an acrylate ester.

14. The process of claim 13 wherein the alkanol is methanol.

* * * * *